US007697567B2

(12) United States Patent
Ono et al.

(10) Patent No.: US 7,697,567 B2
(45) Date of Patent: Apr. 13, 2010

(54) PACKET SCHEDULING METHOD AND APPARATUS FOR DOWNLINK TRANSMISSION TO MOBILE TERMINALS

(75) Inventors: Masahiro Ono, Tokyo (JP); Yasuhiko Matsunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 1638 days.

(21) Appl. No.: 10/345,311

(22) Filed: Jan. 16, 2003

(65) Prior Publication Data

US 2003/0133457 A1    Jul. 17, 2003

(51) Int. Cl.
*H04J 3/16* (2006.01)
(52) U.S. Cl. ................. 370/468; 370/389; 370/412; 370/428; 370/429
(58) Field of Classification Search ............ 370/230, 370/232, 241, 252, 253, 328, 329, 335, 338, 370/342, 343, 345, 349, 389, 391, 394, 412, 370/428, 429, 431, 437, 441, 465, 468, 474, 370/478, 479, 480, 498
See application file for complete search history.

(56) References Cited

U.S. PATENT DOCUMENTS

| | | | | |
|---|---|---|---|---|
| 5,226,071 | A * | 7/1993 | Bolliger et al. | 455/435.3 |
| 5,301,356 | A * | 4/1994 | Bodin et al. | 455/436 |
| 5,903,840 | A * | 5/1999 | Bertacchi | 455/436 |
| 6,452,915 | B1 * | 9/2002 | Jorgensen | 370/338 |
| 6,590,890 | B1 | 7/2003 | Stolyar et al. | |
| 6,778,687 | B2 * | 8/2004 | Sanders et al. | 382/125 |
| 6,895,235 | B2 * | 5/2005 | Padgett et al. | 455/406 |

(Continued)

FOREIGN PATENT DOCUMENTS

EP    1330080 A3 *    2/2004

(Continued)

OTHER PUBLICATIONS

Fragouli et al.; Controlled Multimedia Wireless Link Sharing via Enhanced Class-based Queuing with Channel-State-Dependent Packet Scheduling; Apr. 2, 1998; IEEE; INFOCOM '98: Seventeenth Annual Joint Conference of the IEEE Computer and Communications Societies Proceedings; vol. 2, pp. 572-580.*

(Continued)

*Primary Examiner*—Pankaj Kumar
*Assistant Examiner*—Mark A Mais
(74) *Attorney, Agent, or Firm*—McGinn IP Law Group, PLLC

(57) ABSTRACT

In a packet repeater of a wireless base station, a packet analyzer receives uplink packets from mobile terminals and stores data indicating quality of each wireless link between the base station and each mobile terminal in a memory. A packet sorter receives downlink packets from a network and stores the received packets into buffers according to the destinations of downlink packets and their service classes. According to the data stored in the memory, packets in the buffers are into a first group of queues in which quality of service is not satisfied and a second group of queues in which quality of service is satisfied. A packet scheduler sequentially transmits all packets from the first-group queues to mobile terminals, and reorders the second-group queues in a descending order of their qualities of wireless links and sequentially transmits all packets from the reordered queues to the mobile terminals.

30 Claims, 10 Drawing Sheets

U.S. PATENT DOCUMENTS

| | | | |
|---|---|---|---|
| 6,937,864 B2 * | 8/2005 | Koo et al. ................ | 455/452.1 |
| 6,940,831 B1 | 9/2005 | Omi et al. | |
| 6,961,349 B2 * | 11/2005 | Malomsoky et al. ........ | 370/469 |
| 6,987,738 B2 * | 1/2006 | Subramanian et al. ...... | 370/252 |
| 6,993,006 B2 * | 1/2006 | Pankaj ........................ | 370/342 |
| 7,012,902 B2 | 3/2006 | Omi et al. | |
| 7,116,646 B1 * | 10/2006 | Gustafson et al. ........... | 370/313 |
| 7,158,794 B2 * | 1/2007 | Choi ....................... | 455/452.2 |
| 7,406,098 B2 * | 7/2008 | Taneja et al. ................ | 370/468 |
| 7,447,181 B1 * | 11/2008 | Forssell ...................... | 370/336 |
| 7,453,801 B2 * | 11/2008 | Taneja et al. ................ | 370/230 |
| 2002/0114292 A1 | 8/2002 | Kawabata et al. | |
| 2003/0096597 A1 * | 5/2003 | Kar-Kin Au et al. ........ | 455/412 |

FOREIGN PATENT DOCUMENTS

| | | |
|---|---|---|
| JP | 11-178049 | 7/1999 |
| JP | 11/178049 | 7/1999 |
| JP | 2000-101637 | 4/2000 |
| JP | 2000-188784 | 7/2000 |
| JP | 2000-244521 | 9/2000 |
| JP | 2001-223716 | 8/2001 |
| JP | 2001-274839 | 10/2001 |
| JP | 2001-333097 | 11/2001 |
| WO | WO 01/71521 A1 | 9/2001 |
| WO | WO 0171521 A1 * | 9/2001 |

OTHER PUBLICATIONS

3GPP TR 25.848; 3rd Generation Partnership Project; Technical Specification Group Radio Access Network; Physical Layer Aspects of UTRA High Speed Downlink Packet Access (Release 4); 2001-03; 3GPP; V4.0.0; pp. 1-89.*

European Search Report for EP03001038 dated Jan. 7, 2004.*

Japanese Office Action for Japanese Application 2002-008159 dated Mar. 23, 2007 [with partial English Translation].*

Japanese Office dated Mar. 23, 2007 with partial English translation.

Christine Fragouli et al., "Controlled Multimedia Wireless Link Sharing via Enhanced Class-Based Queuing with Channel-State-Dependent Packet Scheduling", INFOCOM '98, IEEE 1998.

"Physical Layer Aspects for High-Speed Downlink Packet Access", 3GPP TR25.848.2001, 3rd Generation Partnership Project; Technical Specificatoin Group Radio Access Network; Physical Layer Aspects of UTRA High Speed Downlink Packet Access (Release 4).

European Search Report dated Jan. 7, 2004. [EP 1 330 080 A3].

* cited by examiner

PACKET SCHEDULING METHOD AND APPARATUS FOR DOWNLINK TRANSMISSION TO MOBILE TERMINALS

BACKGROUND OF THE INVENTION

1. Field of the Invention

The present invention relates generally to packet communication, and more specifically to a method and an apparatus for scheduling packets for downlink transmission to mobile terminals from a cell-site base station.

2. Description of the Related Art

A number of packet scheduling techniques are known in the art. One of the known techniques is the round-robin system which is currently under study by the High Speed Downlink Speed Access System (HSDPA) of the 3rd Generation Partnership Project (3GPP) and is known as "Physical Layer Aspects for High Speed Downlink Packet Access", 3GPP TR25. 848. 2001. In this system, downlink packets are transmitted in a round-robin fashion from a base station equally to mobile terminals. Since fairness is ensured when assigning time slots, equitable throughputs are realized. Another technique known as the Max C/I system ("Physical Layer Aspects for High Speed Downlink Packet Access", 3GPP TR25. 848. 2001), also currently under study by 3GPP, uses the carrier-to-interference ratios of wireless links and transmits downlink packets in a descending order of their C/I ratios. However, these known techniques are still unsatisfactory in terms of fairness and throughput. Additionally, in both of these known techniques no consideration is taken with regard to quality of service.

According to another technique called "CBQ with CSDPS" as discussed in a paper "Controlled Multimedia Wireless Link Sharing via Enhanced Class-Based Queuing with Channel-State-Dependent Packet Scheduling", Fragouli et al., INFOCOM '98, packets are transmitted at guaranteed data rates according to different services and residual bandwidths are equally assigned to mobile terminals. Qualities of wireless links are also taken into account for downlink transmission. However, packet transmission is perform in so far as the wireless link satisfies a predetermined quality level. As a result, the data rates of all downlink packet transmissions of a whole cell-site tends to decrease to a low level.

SUMMARY OF THE INVENTION

It is therefore an object of the present invention to provide a method and a apparatus for improved packet scheduling in terms of fairness and throughput, and additionally in terms of quality of service.

According to a first aspect of the present invention, there is provided a method of scheduling packets for transmission from a wireless base station to a plurality of mobile terminals. The method comprises (a) receiving packets from a network and forming the received packets into a plurality of queues according to destinations of the mobile terminals, (b) reordering the queues in a descending order of qualities of wireless links between the base station and the mobile terminals, (c) assigning data rates to the queues respectively according to the qualities of wireless links, and (d) sequentially transmitting packets from the reordered queues to the mobile terminals.

According to a second aspect, the present invention provides a method of scheduling packets for transmission from a wireless base station to a plurality of mobile terminals, which comprises (a) receiving packets from a network and forming the received packets into a plurality of queues according to destinations of the mobile terminals, (b) transmitting a packet from one of the queues which is formed prior to a predetermined past time interval, (c) reordering those of the queues which are formed within the predetermined past time interval in a descending order of qualities of wireless links between the base station and the mobile terminals, and (d) sequentially transmitting packets from the reordered queues to the mobile terminals.

According to a third aspect, the present invention provides a method of scheduling packets for transmission from a wireless base station to a plurality of mobile terminals, which comprises (a) receiving packets from a network and forming the received packets into a plurality of queues according to destinations of the mobile terminals, (b) transmitting at least one mobility management packet from one of the queues to the mobile terminals, (c) reordering the queues in a descending order of qualities of wireless links between the base station and the mobile terminals, and (d) sequentially transmitting packets from the reordered queues to the mobile terminals.

According to a fourth aspect, the present invention provides a method of scheduling packets for transmission from a wireless base station to a plurality of mobile terminals, which comprises (a) receiving packets from a network and forming the received packets, according to destinations of the mobile terminals, into a first group of queues in which quality of service is not satisfied and a second group of queues in which quality of service is satisfied, (b) sequentially transmitting all packets from the queues of the first group to the mobile terminals, and (c) reordering the queues of the second group in a descending order of qualities of wireless links between the base station and the mobile terminals, and sequentially transmitting all packets from the reordered queues of the second group to the mobile terminals.

According to a fifth aspect, the present invention provides a packet repeater for repeating packets for transmission from a wireless base station to a plurality of mobile terminals. The packet repeater comprises a memory, a packet analyzer for receiving uplink packets from the mobile terminals and storing data indicating quality of each wireless link between the base station and each of the mobile terminals in the memory, a plurality of buffers, a packet sorter for receiving downlink packets from a network and storing the received packets into the buffers according to destinations of the downlink packets, and a packet scheduler for reordering the queues in a descending order of qualities of wireless links between the base station and the mobile terminals, assigning data rates to the queues respectively according to the qualities of wireless links, and sequentially transmitting packets from the reordered queues to the mobile terminals.

According to a sixth aspect, the present invention provides a packet repeater for repeating packets for transmission from a wireless base station to a plurality of mobile terminals, comprising a memory, a packet analyzer for receiving uplink packets from the mobile terminals and storing data indicating quality of each wireless link between the base station and each of the mobile terminals in the memory, a plurality of buffers, a packet sorter for receiving downlink packets from a network and storing the received packets into the buffers according to destinations of the downlink packets, and a packet scheduler for transmitting a packet from one of the queues which is formed prior to a predetermined past tine interval, reordering those of the queues which are formed within the predetermined past time interval in a descending order of qualities of wireless links between the base station and the mobile terminals, and sequentially transmitting packets from the reordered queues to the mobile terminals.

According to a seventh aspect, the present invention provides a packet repeater for repeating packets for transmission from a wireless base station to a plurality of mobile terminals, comprising a memory, a packet analyzer for receiving uplink packets from the mobile terminals and storing data indicating quality of each wireless link between the base station and each of the mobile terminals in the memory, a plurality of buffers, a packet sorter for receiving downlink packets from a network and storing the received packets into the buffers according to destinations of the downlink packets, and a packet scheduler for transmitting at least one mobility management packet from one of the queues to the mobile terminals, reordering the queues in a descending order of qualities of wireless links between the base station and the mobile terminals, and sequentially transmitting packets from the reordered queues to the mobile terminals.

According to an eighth aspect, the present invention provides a packet repeater for repeating packets for transmission from a wireless base station to a plurality of mobile terminals, comprising a memory, a packet analyzer for receiving uplink packets from the mobile terminals and storing data indicating quality of each wireless link between the base station and each of the mobile terminals in the memory, a plurality of buffers, a packet sorter for receiving downlink packets from a network and storing the received packets into the buffers according to destinations of the downlink packets and data stored in the memory to form a first group of queues in which quality of service is not satisfied and a second group of queues in which quality of service is satisfied, and a packet scheduler for sequentially transmitting all packets from the queues of the first group to the mobile terminals, and reordering the queues of the second group in a descending order of qualities of wireless links between the base station and the mobile terminals and sequentially transmitting all packets from the reordered queues of the second group to the mobile terminals.

According to another aspect, the present invention provides a non-transitory computer-readable storage medium containing a program of machine-readable instructions for executing a method of scheduling packets for transmission from a wireless base station to a plurality of mobile terminals which comprises receiving packets from a network and forming the received packets into a plurality of queues according to destinations of said mobile terminals; and reordering the queues in a descending order of qualities of wireless links between the base station and the mobile terminals; assigning data rates to the queues respectively according to the qualities of wireless links; and sequentially transmitting packets from the reordered queues to the mobile terminals; assigning an additional bandwidth to one of said queues in which quality of service is not satisfied and informing a mobile terminal of the assigned bandwidth; reordering the queues in which quality of service is satisfied according to a descending order of qualifies of associated wireless links between the base station and the mobile terminals; and respectively assigning additional bandwidths to the reordered queues according to the qualities of associated wireless links and informing the mobile terminals of the assigned respective bandwidths.

BRIEF DESCRIPTION OF THE DRAWINGS

The present invention will be described in detail further with reference to the following drawings, in which.

DETAILED DESCRIPTION

Figure 1:
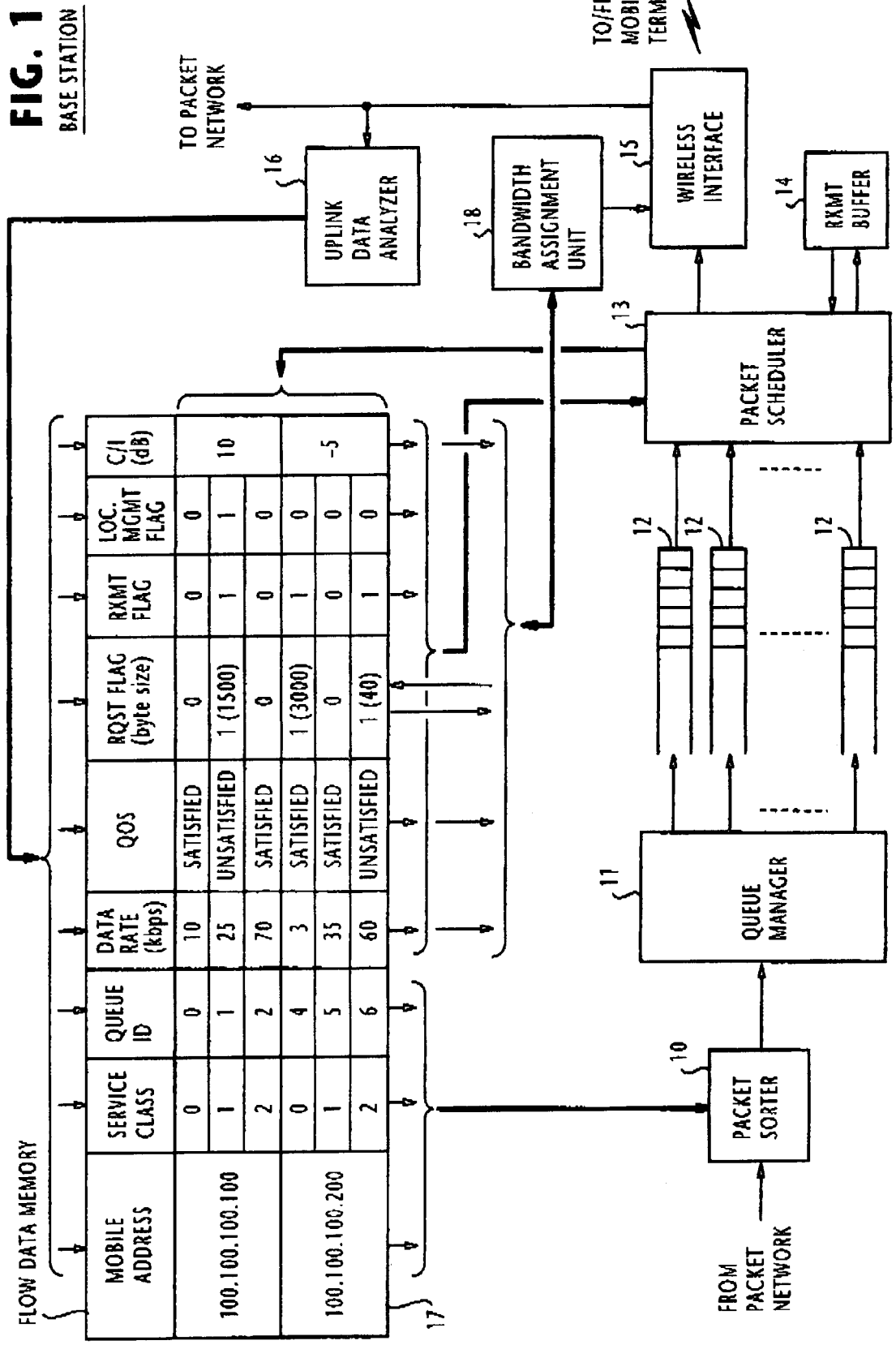
FIG. 1 is a block diagram of a downlink repeater according to a first embodiment of the present invention.

Referring to FIG. 1, there is shown a downlink repeater of a wireless base station of a mobile communications network according to a first embodiment of the present invention. As is well known in the mobile communications art, the base station, located at a cell site, is one of a plurality of base stations which are connected to a packet switched network. The base station establishes wireless links with mobile terminals residing within its cell-site area for uplink and downlink transmissions of packets.

From the packet network, the downlink repeater receives downlink packets of a remote terminal through a packet sorter 10 and schedules their timing for transmission to a home mobile terminal through a wireless interface 15. The downlink repeater includes an uplink data analyzer 16.

Through the wireless interface 15, uplink packets of the home mobile terminal are received and transmitted to the packet network. Uplink data analyzer 15 receives these uplink packets and analyzes their contents to determine their mobile addresses, service classes, data rates, QoS (quality of service) flags, request flags (byte size or bandwidth), retransmit flags, mobility management flags and carrier-to-interference values. In the present invention, carrier-to-interference ratio is used as a measure of the quality of a wireless link (either downlink or uplink) between the base station and a mobile terminal. Note that the QoS flag of a queue indicates whether or not the QoS parameter of the queue is satisfied. Uplink data analyzer 16 sets the analyzed contents into a corresponding entry (row) of a flow data memory 17.

Flow data memory 17 is partitioned into a plurality of entries respectively corresponding to buffers 12, or queues which are identified by queue identifiers (ID). When a session begins between home and remote terminals using a number of different service classes, a corresponding number of entries are created for the session in the flow data memory 17. One typical example of data for two home mobile terminals is illustrated.

When the packet sorter 10 receives a downlink packet from the network, it reads a destination mobile address and a service class from its header and proceeds to read a queue ID from the flow data memory 17 corresponding to the destination mobile address and the service class of the downlink packet. Packet sorter 10 thus identifies a queue for the received packet and instructs a queue manager 11 to establish a connection to one of the queues 12 that is identified. The received downlink packet is thus placed in the corresponding queue, waiting for transmission to the home mobile terminal.

The outputs of the queues 12 are connected to a packet scheduler 13. Since each queue is a first-in-first-out (FIFO) memory, the received downlink packets are forwarded to the packet scheduler 13 on a first-in-first-out basis. Packet scheduler 13 of the first embodiment of the present invention reads data from the flow data memory 17 in a number of ways according to flowcharts of FIGS. 2, 3 and 4 and determines the priorities of the queues 12 and forwards a packet from the queue of highest priority to the wireless interface 15. A retransmit memory 14 is connected to the packet scheduler 13 as a temporary storage for copies of transmitted downlink packets.

When a downlink packet is sent from a given queue to a mobile terminal, the latter responds with an acknowledgement packet for signaling successful receipt of the downlink packet. In response to an acknowledgement packet, the uplink data analyzer 16 sets a "0" in the retransmit flag of an entry of the flow data memory corresponding to the given queue. If an acknowledgement packet is not returned within a predetermined time interval following the transmission of a downlink packet, the uplink data analyzer sets a "1" in the retransmit flag.

Figure 2:
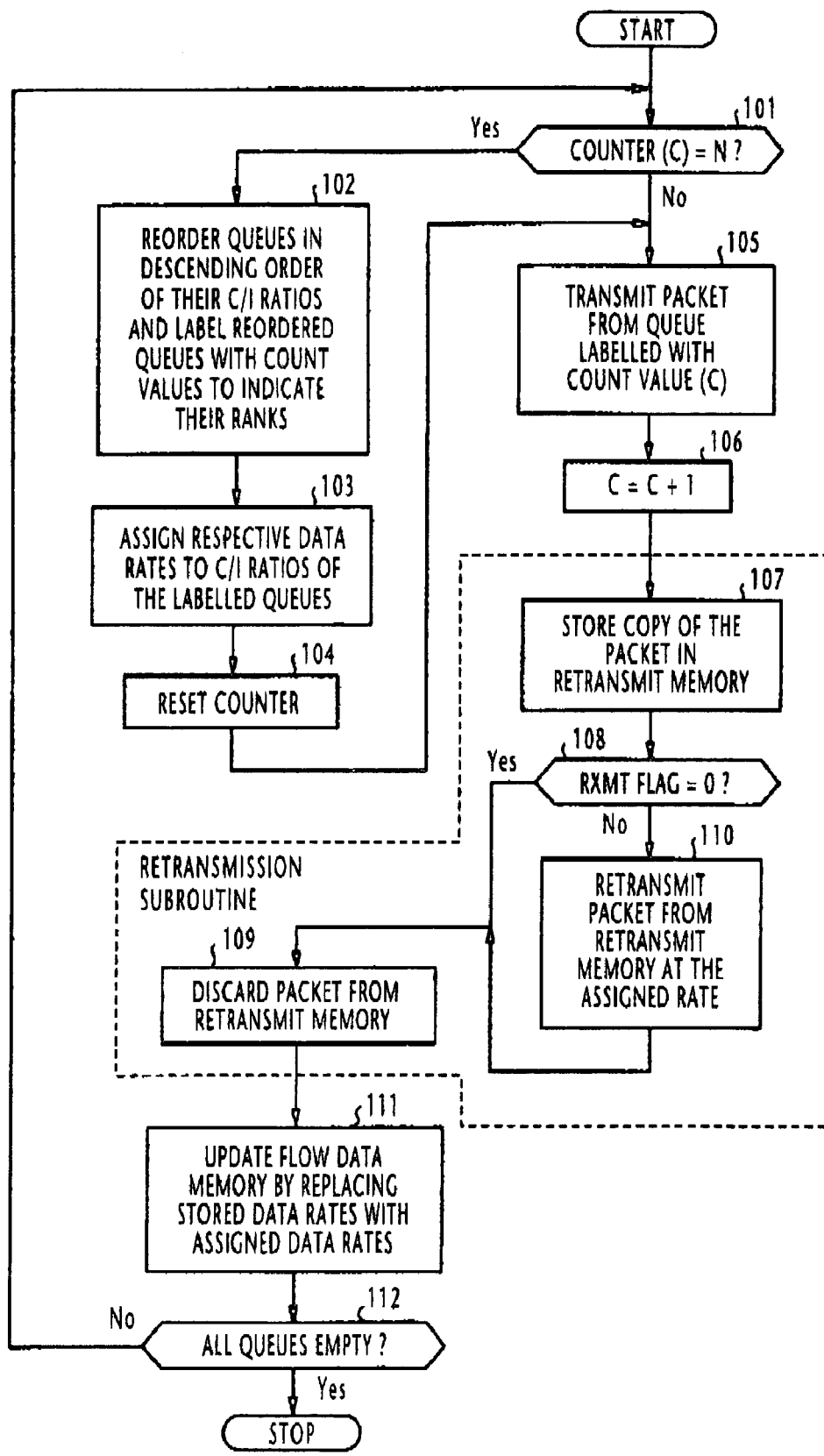
FIG. 2 is a flowchart of the operation of the packet scheduler of FIG. 1 according to a first mode of operation of the first embodiment.

In FIG. 2, the packet scheduler uses a queue cycle counter to detect the timing when a packet transmission has been performed once for each of the queues 12 to prioritize all queues for a subsequent cycle of N packet transmissions, where N is equal to the number of queues 12. The operation of the packet scheduler 13 begins at decision step 101 that checks to see if the count value (C) of the queue cycle counter is equal to N. If the decision is affirmative at step 101, the packet scheduler 13 proceeds to step 102 to read the C/I ratios of all queues from the flow data memory and reorders the queues 12 in a descending order of their carrier-to-interference ratios. Thus, the queue having the highest value of C/I ratios is positioned at the top of all queues. Additionally, the reordered queues are labeled respectively with count values to indicate their ranks. In this manner, the top-position queue is labeled with a count value indicating the highest rank.

At step 103, the packet scheduler assigns respective data rates to the reordered queues according to their C/I ratios so that the top-ranking queue is assigned a data rate that is highest of all the assigned data rates. In a specific aspect, different C/I ratios of predetermined values are mapped to corresponding weight factors in advance in memory. To assign a date rate to a queue having a given C/I ratio other than the highest value, a weight factor is determined for the queue corresponding to the given C/I ratio and the highest date rate of the queues is weighted by the weight factor. The weighted data rate is then assigned to that queue.

The queue cycle counter is then reset to zero at step 104 and flow proceeds to step 105 to begin a packet transmission.

At step 105, the packet scheduler extracts a packet from a queue labeled with the count value (C) of the queue cycle counter and transmits it to the destination mobile terminal of the packet at the assigned data rate of the queue. At step 106, the packet scheduler increments the queue cycle counter by one, and performs a packet retransmission subroutine.

In the packet retransmission subroutine, the packet scheduler stores a copy of the transmitted packet in the retransmit memory 14 at step 107, and proceeds to decision step 108 to check to see if the retransmit flag of the queue in the flow data memory 17 is reset to zero. If the destination mobile terminal has successfully received the packet, the uplink data analyzer 16 must have received an acknowledgement packet from the mobile terminal within a predetermined time interval and reset the retransmit flag to "0". Otherwise, the uplink data analyzer has set a "1" in the retransmit flag of the queue. If the packet scheduler determines that the retransmit flag of the queue has been set to "0", flow proceeds from decision step 108 to step 109 to discard the copy of the packet from the retransmit memory 14. If the decision at step 108 is negative, the packet scheduler proceeds to step 110 and reads the copy of the packet from retransmit memory 14 and transmits it to the destination mobile terminal and proceeds to step 109 to discard the copy of the packet.

At step 111, the packet scheduler updates the data rates of flow data memory 17 the data rates assigned at step 102. Flow proceeds to step 112 to determine whether all queues are empty. If all queues are not empty, the packet scheduler returns to step 101 to repeat the process. If all queues are empty, the routine is terminated.

Figure 3:
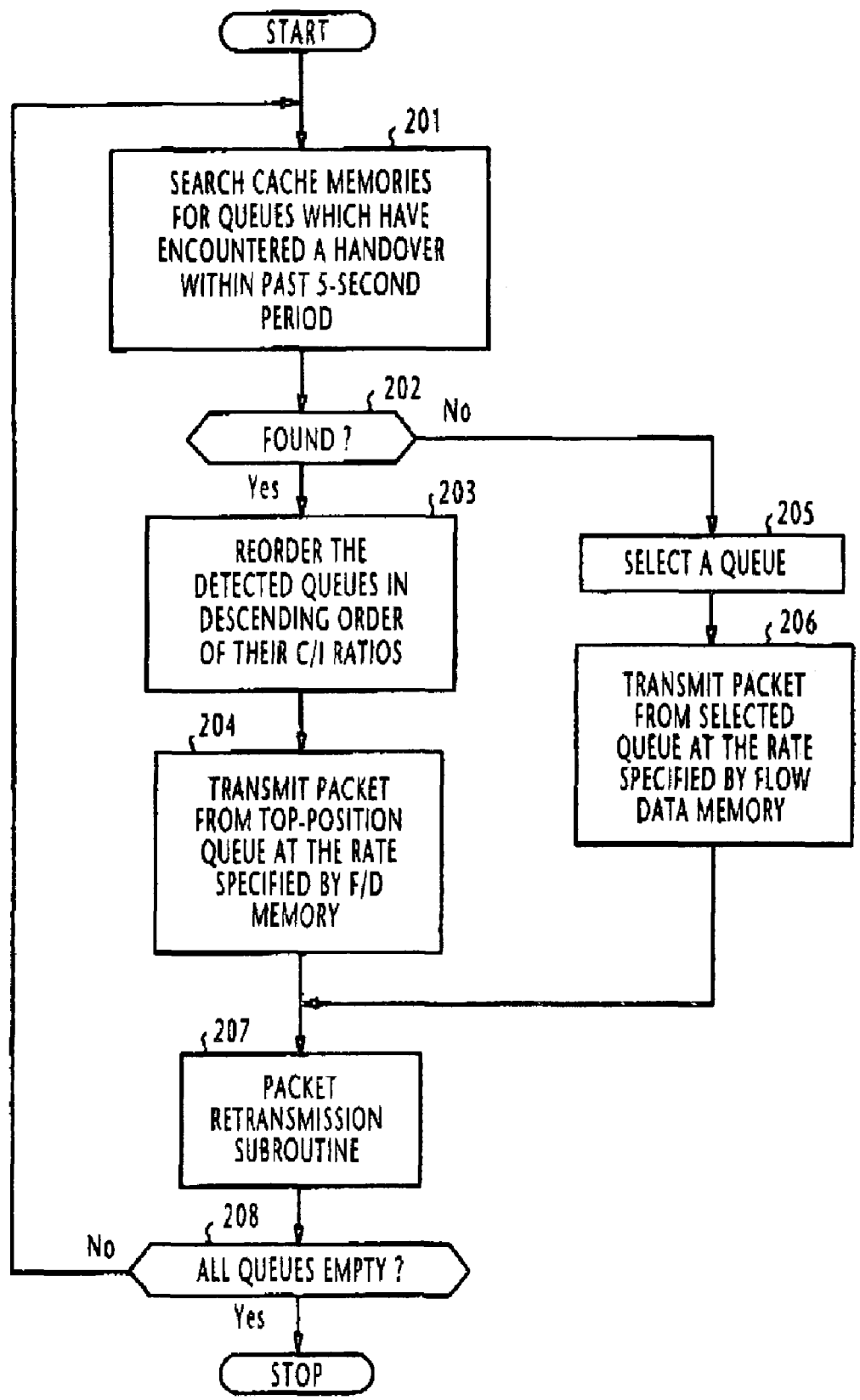
FIG. 3 is a flowchart of the operation of the packet scheduler of FIG. 1 according to a second mode of operation of the first embodiment.

In FIG. 3, the packet scheduler uses the handover events that have occurred within a predetermined past time interval due to mobile terminals moving into the cell-site area of the base station from neighboring areas as a decision time instant for the assignment of priorities to the queues 12. For this purpose, cache memories may be provided for respective entries (queues) of the flow data memory to autonomously maintain the time lapse of each of new queues created in the flow data memory 17 in response to the occurrence of a handover when a mobile terminal enters the cell-site area of the base station.

The operation of the packet scheduler begins at step 201 to make a search through the cache memories for queues which have encountered a handover within a past 5-second time interval. If such queues are detected (step 202), their C/I ratios are read from the memory 17 and the detected queues are reordered in a descending order of their C/I ratios so that the queue having the highest C/I ratio is positioned at the top of the reordered queues (step 203). A packet is then transmitted from the top-position queue at the data rate of the queue specified in the corresponding entry of flow data memory 17 (step 204).

If there is no queue that has been created in the flow data memory within the past 5-second interval, the decision at step 202 is negative and flow proceeds to step 205 to select any one of the queues and a packet is transmitted from the selected queue at the data rate of the queue specified in the flow data memory (step 206).

A packet retransmission subroutine 207 is then performed. At step 208, the packet scheduler 13 performs recalculations on all queues as to their data rates by taking into their service classes and other factors and updates the flow data memory 17. Flow proceeds to step 209 to determine whether all queues are empty. If all queues are not empty, the packet scheduler returns to step 201 to repeat the process. If all queues are empty, the routine is terminated.

Figure 4:
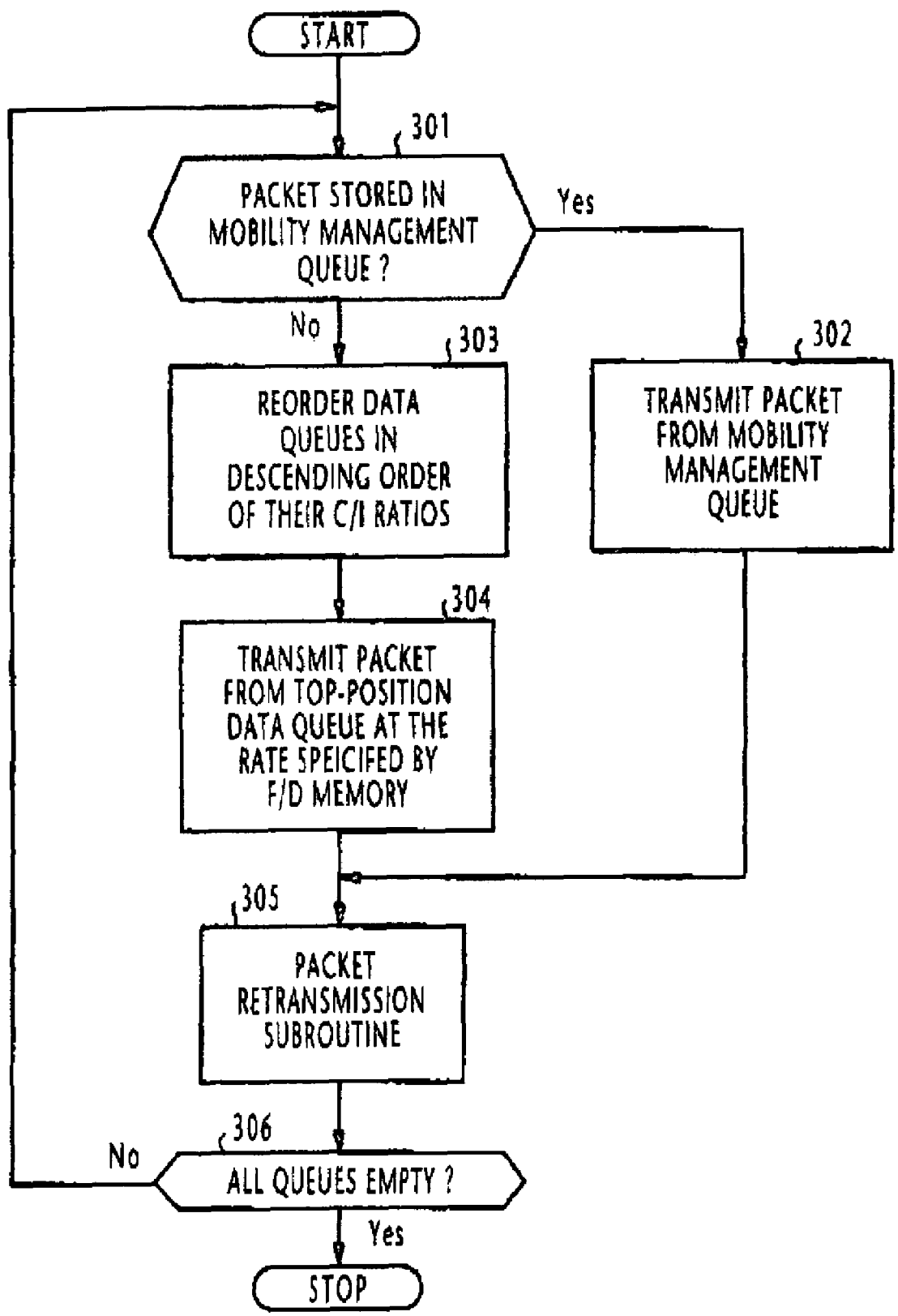
FIG. 4 is a flowchart of the operation of the packet scheduler of FIG. 1 according to a third mode of operation of the first embodiment.

In FIG. 4, the downlink repeater reserves one of the queues 12 as a mobility management queue to be used as a storage area of mobility management packets and uses the other queues as data queues as storage areas of user packets. When the header of a downlink packet from the packet network indicates that the source of the packet is a location register, the packet sorter 10 instructs the queue manager 11 to store the packet into the mobility management queue. The operation of the packet scheduler 13 begins with decision step 301 to check to see if a packet is stored in the mobility management queue. If this is the case, flow proceeds to step 302 to transmit a packet from the mobility management queue. If no packet is stored in the mobility management queue, flow proceeds from step 301 to step 303 to reorder the data queues in a descending order of their C/I ratios so that the queue having the highest value of C/I ratio is positioned at the top of the queues. At step 304, a packet is transmitted from the top-position data queue at the data rate of the queue specified in the flow data memory 17.

After packet retransmission subroutine 305 is performed following the execution of step 302 or 304, the packet scheduler 13 proceeds to step 306 to check to see if all queues are empty. If all queues are not empty, flow returns to step 301 to repeat the process. Otherwise, the routine is terminated.

Figure 5:
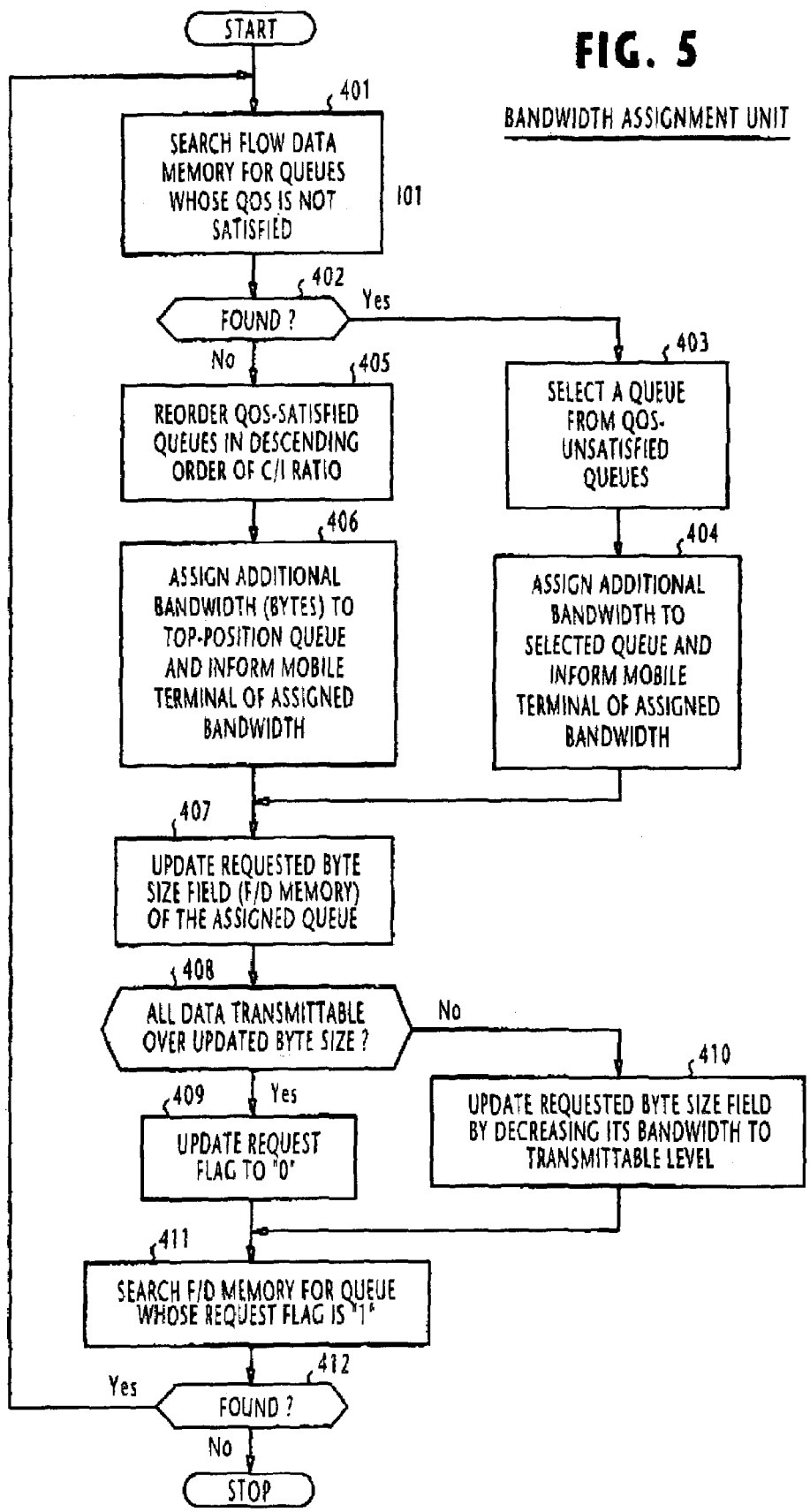
FIG. 5 is a flowchart of the operation of the bandwidth assignment unit of FIG. 1.

The downlink repeater of the first embodiment further includes a bandwidth assignment unit 18, which is connected to the wireless interface 15 for transmitting a bandwidth assignment packet to a mobile terminal by using the flow data memory 17 according to the flowchart of FIG. 5. In this embodiment, the request flag of the flow data memory 17 is used to indicate whether the requested bandwidth is satisfied (request flag="0") or not satisfied (request flag="1").

In FIG. 5, the bandwidth assignment unit 18 begins its operation at step 401 by making a search through the flow data memory 17 for queues whose QoS value is not satisfied. If such QoS-unsatisfied queues are found (step 402), flow proceeds to step 403 to select a queue from the QoS-unsatisfied queues. At step 404, the assignment unit 18 assigns an additional bandwidth to the selected queue and sends a packet to the destination mobile terminal to inform the assigned additional bandwidth (bytes). If QoS-unsatisfied queues are not found in the flow data memory, all queues are QoS-satisfied queues and flow proceeds from step 402 to step 405 to reorder the QoS-satisfied queues in a descending order of their C/I ratios so that the queue having the highest value of C/I ratio is positioned at the top of the queues. At step 406, the assignment unit 18 assigns an additional bandwidth to the top-position queue. Following the execution of steps 404 and 406, flow proceeds to step 407 to update the requested byte size field of the assigned queue of the flow data memory with the additionally assigned bandwidth.

At decision step 408, the assignment unit 18 checks to see if all data are transmittable over the updated bandwidth. If the decision is affirmative, flow proceeds to step 409 to update the request flag to "0". Otherwise, the requested byte size field is updated by decreasing its bandwidth to transmittable level (step 410).

At step 411, the assignment unit 18 searches the flow data memory 17 for a queue whose request flag is set to "1". If such a queue is found (step 412), the user requested bandwidth is not satisfied and flow returns to step 401 to repeat the process. Otherwise, the routine is terminated.

Figure 6:
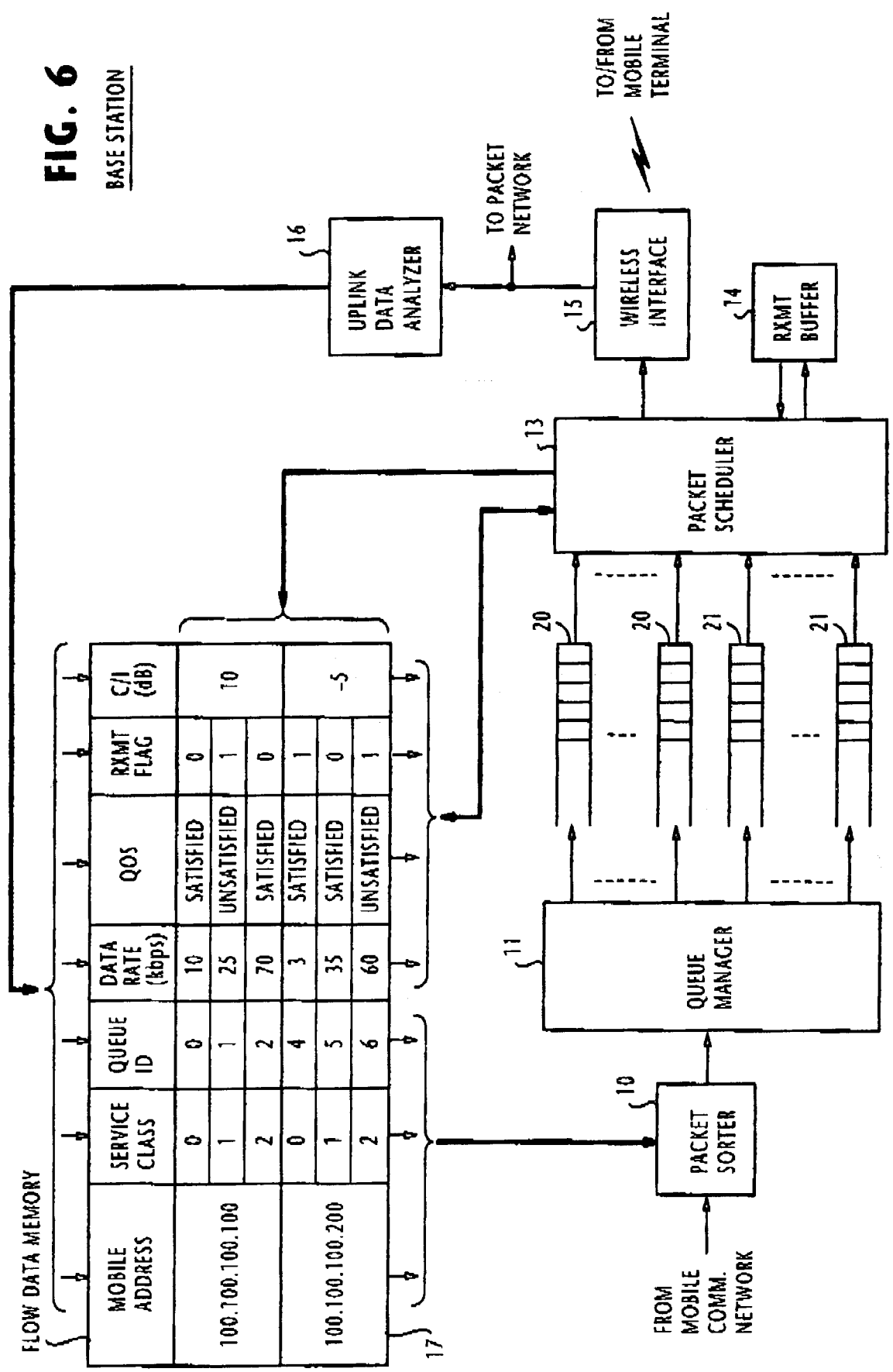
FIG. 6 is a block diagram of a downlink repeater according to a second embodiment of the present invention.

A downlink repeater of a second embodiment of the present invention is shown in FIG. 6 in which elements corresponding in significance to those in FIG. 1 are marked with the same numerals as used in FIG. 1 and the description thereof is omitted. The downlink repeater of FIG. 6 differs essentially from the first embodiment in that the queues are divided into a QoS-satisfied group of queues 20 and a QoS-unsatisfied group of queues 21. In response to receipt of a downlink packet from the packet network, the packet sorter 10 examines its QoS parameter in the flow data memory 17 and determines if the QoS of the packet is satisfied or not. If the flow data memory 17 indicates that the QoS is satisfied for the packet, the packet sorter 10 instructs the queue manager 11 to store the packet into a corresponding one of the QoS-satisfied queues 20. Otherwise, the packet is stored in a corresponding one of the QoS-unsatisfied queues 21.

Packet scheduler 13 of the second embodiment operates in a number of modes to assign higher priority to the QoS-unsatisfied queues 21 over the QoS-satisfied queues 20 according to the flowcharts of FIGS. 7, 8, 9 and 10.

Figure 7:
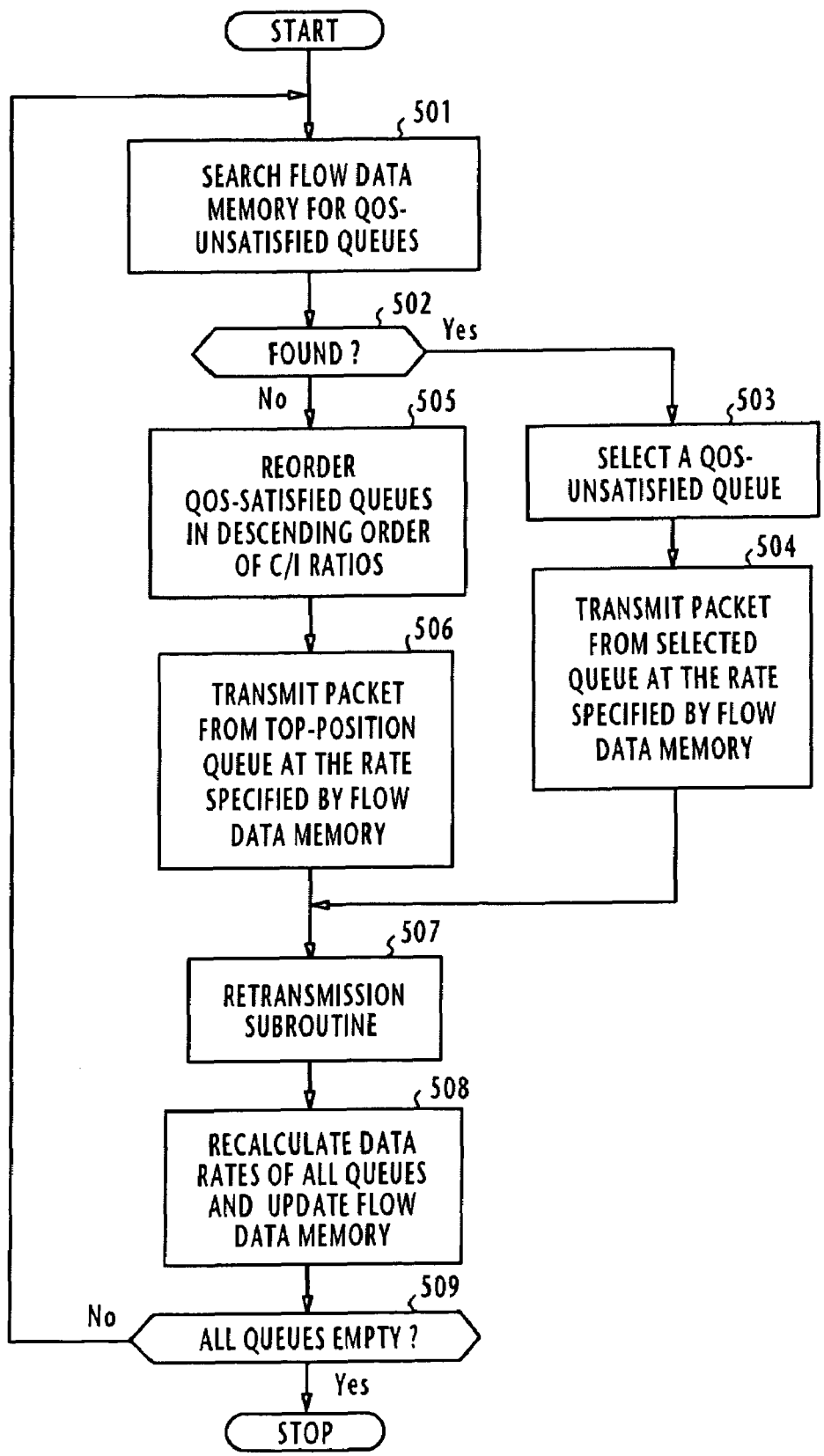
FIG. 7 is a flowchart of the operation of the packet scheduler of FIG. 6 according to a first mode of operation of the second embodiment.

In FIG. 7, the operation of the packet scheduler of FIG. 6 begins with step 501 to make a search through the flow data memory 17 for a QoS-unsatisfied queue 20. If at least one QoS-unsatisfied queue is found in the flow data memory (step 502), flow proceeds to step 503 to select a QoS-unsatisfied queue if more than one QoS-unsatisfied queue exists and a packet is transmitted from the selected queue at the data rate of the queue specified in the flow data memory (step 504). Obviously, if there is only one Qos-unsatisfied queue 21 that is detected, a packet is sent from this queue at step 504.

If there is no QoS-unsatisfied queue 21 in which packets are waiting for transmission, flow proceeds from step 502 to step 505 to reorder the QoS-satisfied queues 20 in a descending order of their C/I ratios so that the queue having the highest C/I ratio is positioned at the top of the QoS-satisfied queues 20. At step 506, a packet is transmitted from the top-position QoS-satisfied queue 20 at the data rate of the queue specified in the flow data memory.

A packet retransmission subroutine 507 then follows. At step 508, the packet scheduler performs recalculations on all queues as to their data rates by taking into their service classes and other factors, reevaluates the QoS-parameters of all queues as to whether their QoS values are satisfied or not and updates the QoS flags of flow data memory 17 for transposing queues between QoS-satisfied group and QoS-unsatisfied group. The emptiness of all queues is checked at step 509 to return to step 501 to repeat the process if all queues are not empty and terminate the routine if all queues are empty.

Figure 8:
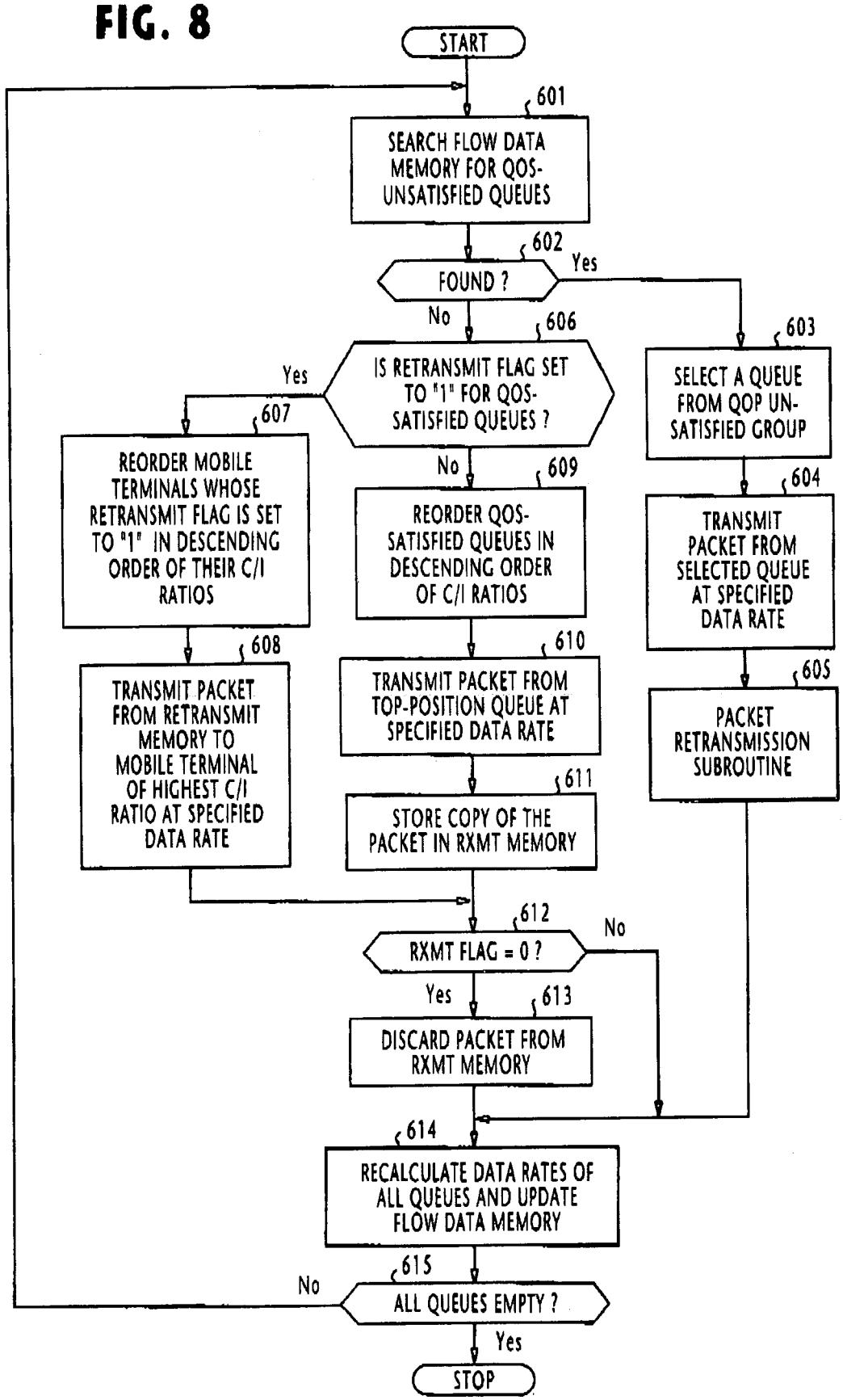
FIG. 8 is a flowchart of the operation of the packet scheduler of FIG. 6 according to a second mode of operation of the second embodiment.

In FIG. 8, the packet scheduler assigns highest priority to QoS-unsatisfied queues 21 over the QoS satisfied queues 20 similar to FIG. 7, and next highest priority to copies of packets of QoS-satisfied queues 20 stored in the retransmit memory 14.

In this variation of the present invention, the operation of the packet scheduler begins with step 601 to make a search through the flow data memory 17 for a QoS-unsatisfied queue 20. If at least one QoS-unsatisfied queue is found in the flow data memory (step 602), flow proceeds to step 603 to select a QoS-unsatisfied queue if more than one QoS-unsatisfied queue exists and a packet is transmitted from the selected queue at the data rate of the queue specified in the flow data memory (step 604). If there is only one QoS-unsatisfied queue 21 that is detected, a packet is sent from this queue. Packet scheduler 13 proceeds from step 604 to step 605 to perform packet retransmission subroutine 605 and proceeds to step 614 to perform recalculations on all queues as to their data rates by taking into their service classes and other factors and updates the flow data memory 17. Flow proceeds to step 615 to determine whether all queues are empty. If all queues are not empty, the packet scheduler returns to step 601 to repeat the process. If all queues are empty, the routine is terminated.

If there is no QoS-unsatisfied queue 21 in which packets are waiting for transmission, flow proceeds from step 602 to next decision step 606 to search the flow data memory for entries of QoS-satisfied queues 20 in which a "1" is set in their retransmit flag.

If there is at least one copy of packet of QoS-satisfied queues is stored in the retransmit memory 14, the decision is affirmative at step 606 and flow proceeds to step 607 to reorder mobile terminals whose retransmit flag is set to "1" in the flow data memory according to their C/I ratios so that the mobile terminal of highest C/I ratio is positioned at the top of all mobile terminals. At step 608, packets are transmitted from the retransmit memory 14 to the mobile terminal of highest C/I ratio at the data rates of this mobile terminal specified in the flow data memory 17. Packet scheduler 13 proceeds from step 608 to step 612 and checks the retransmit flag of the entry of flow data memory corresponding to the transmitted packet to see if it has changed to "0". If this is the case, the copy of the packet is discarded from the retransmit memory 14 (step 613) and flow proceeds to step 614. Otherwise, flow proceeds from step 612 to step 614, leaving the unacknowledged packet in the retransmit memory 14.

If there is no packet of QoS-satisfied queues is stored in the retransmit memory 14, the decision is negative at step 606 and flow proceeds to step 609 to reorder the QoS-satisfied queues 20 in a descending order of their C/I ratios so that the queue of highest C/I ratio is positioned at the top of all QoS-satisfied queues. At step 610, a packet is transmitted from the top-position QoS-satisfied queue at the data rate of the queue specified in the flow data memory, and flow proceeds to step 611 to store a copy of the packet in the retransmit memory 14. Packet scheduler 13 proceeds from step 611 to step 612 and checks the retransmit flag of the entry of flow data memory corresponding to the transmitted packet to see if it has changed to "0". If so, the copy of the packet is discarded from the retransmit memory 14 (step 613) and flow proceeds to step 614 for recalculations and updating of the flow data memory. If the transmitted packet is not acknowledged by the destination, the retransmit flag is set to "1", and flow proceeds from step 612 to step 614, leaving the unacknowledged packet in the retransmit memory 14.

As the routine FIG. 8 is repeatedly executed, copies of unacknowledged downlink packets will be stored in the retransmit memory 14 and will be given higher priority over the packets of QoS-satisfied queues 20 for retransmission.

Figure 9:
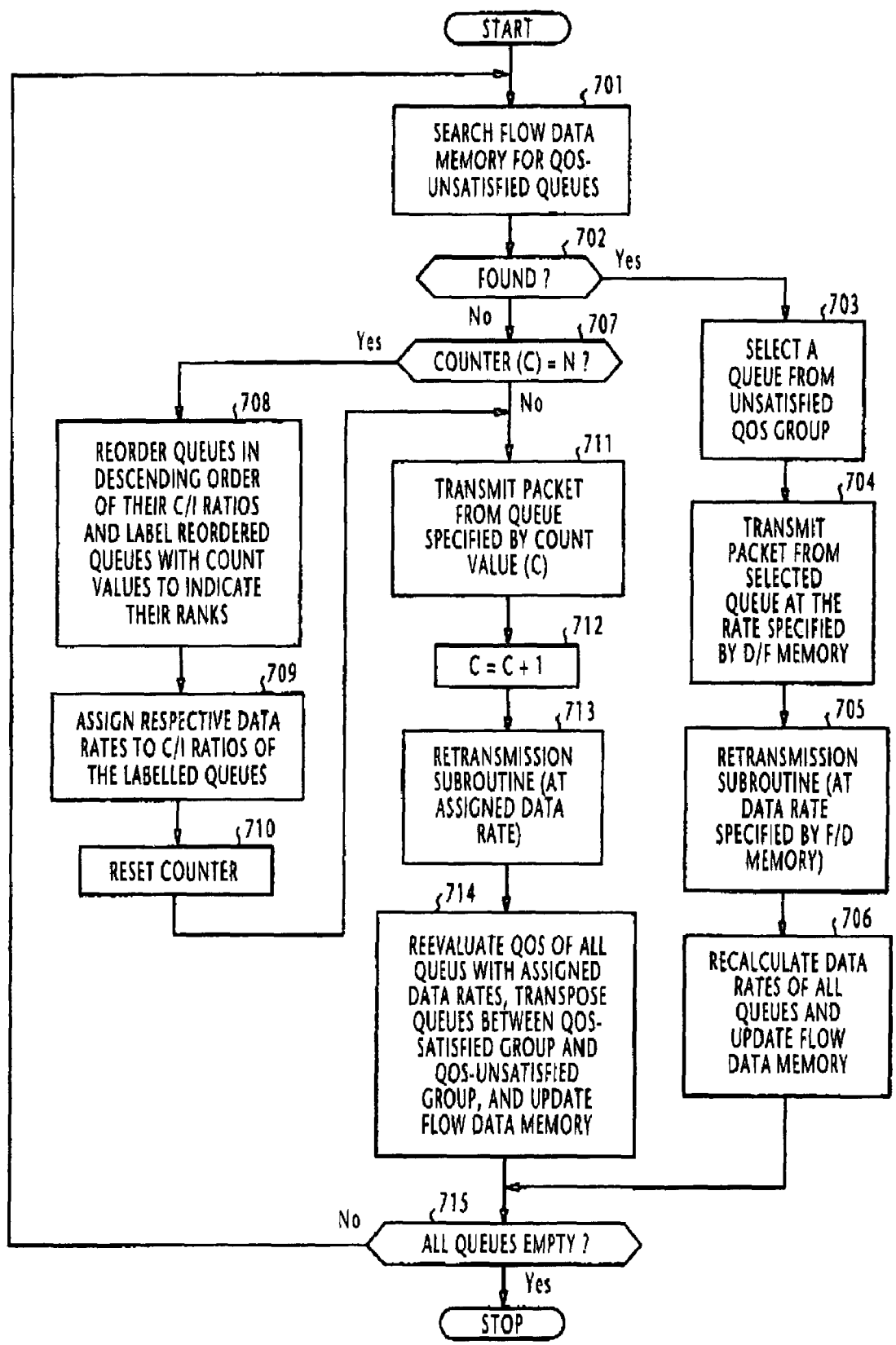
FIG. 9 is a flowchart of the operation of the packet scheduler of FIG. 6 according to a third mode of operation of the second embodiment.

In FIG. 9, the packet scheduler assigns highest priority to QoS-unsatisfied queues 21 over the QoS-satisfied queues 20 similar to FIGS. 7 and 8, and then uses a queue cycle counter to detect the timing when a packet transmission has been performed once for each of the QoS-satisfied queues 20 and prioritizes all QoS-satisfied queues for a subsequent cycle of N packet transmissions, where N is equal to the number of QoS-satisfied queues 20.

In this variation, the operation of the packet scheduler begins with step 701 to make a search through the flow data memory 17 for a QoS-unsatisfied queue 20. If at least one QoS-unsatisfied queue is found in the flow data memory (step 702), flow proceeds to step 703 to select a QoS-unsatisfied queue if more than one QoS-unsatisfied queue exists and a packet is transmitted from the selected queue at the data rate of the queue specified in the flow data memory (step 704). If there is only one QoS-unsatisfied queue 21 that is detected, a packet is sent from this queue. Packet scheduler 13 proceeds from step 704 to packet retransmission subroutine 705 in which packet is transmitted at the data rate of the queue specified in the flow data memory 17. At step 706, the packet scheduler performs recalculations on all queues as to their data rates by taking into their service classes and other factors and updates the flow data memory 17. Flow proceeds to step 715 to determine whether all queues are empty. If all queues are not empty, the packet scheduler returns to step 701 to repeat the process. If all queues are empty, the routine is terminated.

If there is no QoS-unsatisfied queue, the decision at step 702 is negative and flow proceeds to step 707 to check to see if the count value (C) of the queue cycle counter is equal to N. If the decision is affirmative at step 707, the packet scheduler 13 proceeds to step 708 to reorder the QoS-satisfied queues 20 in a descending order of their C/I ratios. Thus, the queue having the highest value of C/I ratios is positioned at the top of all QoS-satisfied queues 20. Additionally, the reordered queues are ranked with labels indicating their ranking according to their qualities of wireless links. At step 709, the packet scheduler assigns respective data rates to the reordered QoS-satisfied queues according to the ranks so that the top-ranking queue is assigned a data rate that is highest of all the assigned data rates. In a specific aspect, different C/I ratios of predetermined values are mapped to corresponding weight factors in advance in memory. To assign a date rate to a QoS-satisfied queue having a C/I ratio other than the highest value, a weight factor is determined for the queue corresponding to the C/I ratio and the highest date rate of the queues is weighted by the weight factor. The weighted data rate is then assigned to that QoS-satisfied queue. The queue cycle counter is then reset to zero at step 710 and flow proceeds to step 711 to begin a packet transmission.

At step 711, the packet scheduler transmits a packet from the top-position QoS-satisfied queue to the destination of the packet at the assigned data rate of the queue. At step 712, the packet scheduler increments the queue cycle counter by one, and performs packet retransmission subroutine 713 at the assigned data rate.

At step 714, the packet scheduler reevaluates the QoS parameters of all queues with the assigned data rates to update the QoS flags, updates the QoS flags, transpose packets between a QoS-satisfied queue and a QoS unsatisfied queue according to the updated QoS flags, and updates the flow data memory according to the evaluation. At step 715, the emptiness of all queues is checked to return to step 701 to repeat the process if all queues are not empty and terminate the routine if all queues are empty.

Figure 10:
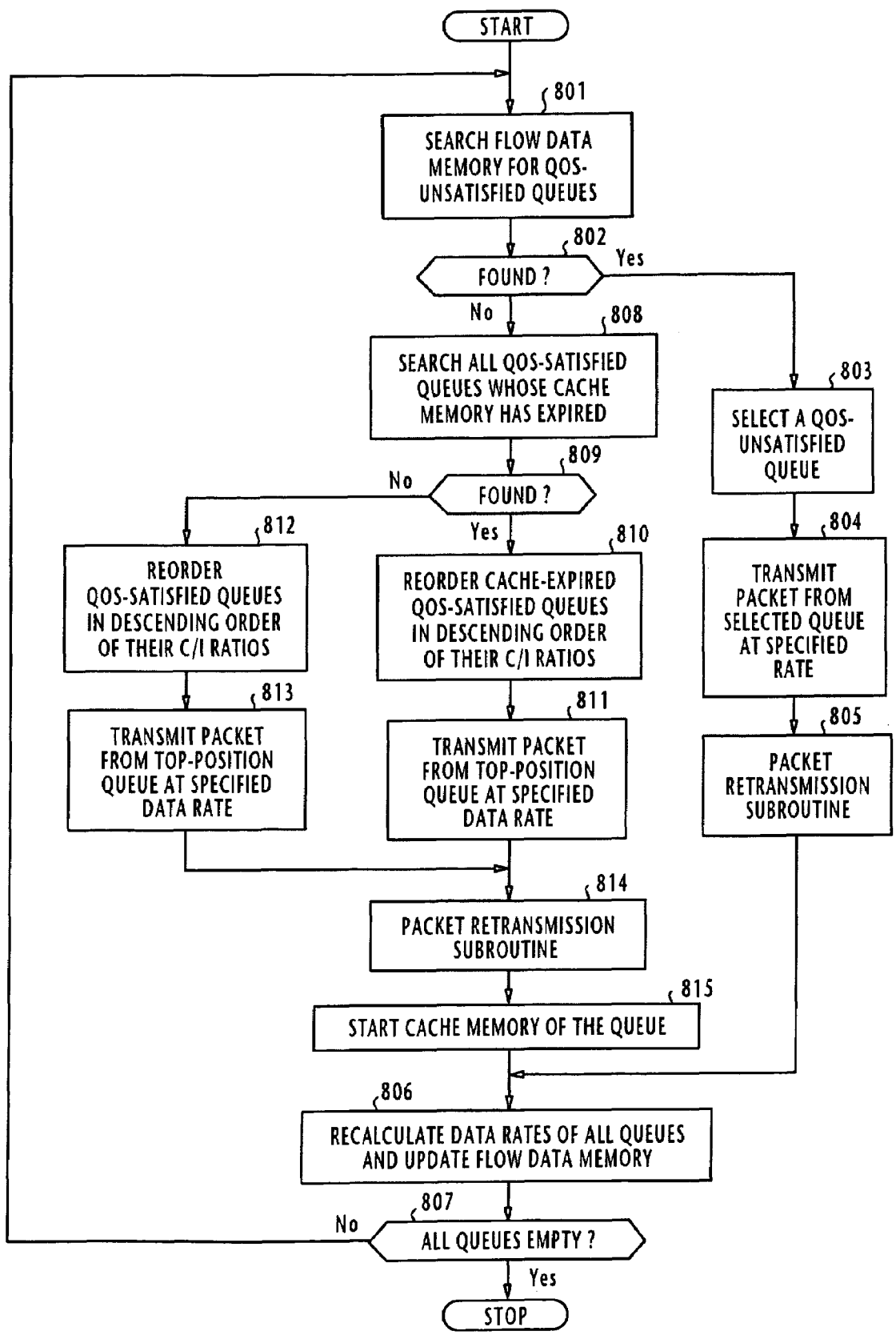
FIG. 10 is a flowchart of the operation of the packet scheduler of FIG. 6 according to a fourth mode of operation of the second embodiment.

In FIG. 10, the packet scheduler assigns highest priority to QoS-unsatisfied queues 21 over the QoS-satisfied queues 20 similar to FIGS. 7, 8 and 9, and then uses a plurality of cache memories for counting the time lapse from the instant a packet is transmitted from each of the QoS-satisfied queues in order to detect those QoS-satisfied queues, as higher priority queues, whose last transmission has occurred a predetermined time interval past.

In this variation, the operation of the packet scheduler begins with step 801 to make a search through the flow data memory 17 for a QoS-unsatisfied queue 20. If at least one QoS-unsatisfied queue is found in the flow data memory (step 802), flow proceeds to step 803 to select a QoS-unsatisfied queue if more than one QoS-unsatisfied queue exists and a packet is transmitted from the selected queue at the data rate of the queue specified in the flow data memory (step 804). If there is only one QoS-unsatisfied queue 21 that is detected, a packet is sent from this queue. Following the execution of step 804, packet retransmission subroutine 805 is performed on a copy of the packet just transmitted from the QoS-unsatisfied queue. Packet scheduler 13 proceeds from packet retransmission subroutine 805 to step 806 to perform recalculations on all queues as to their data rates and reevaluates their QoS values and transposes packets between QoS-satisfied queues and QoS-unsatisfied queues and updates the flow data memory 17 accordingly, and makes an emptiness test for all queues (step 807) to return to step 801 if they are not all-empty or terminate the routine otherwise.

If there is no QoS-unsatisfied queue, flow proceeds from step 802 to step 808 to make a search through all QoS-satisfied queues whose cache memory has expired. If there is at least one QoS-satisfied queue whose last packet transmission has occurred before a predetermined time interval past, the cache memory of the queue has expired already and the decision at step 809 is affirmative. In this case, flow proceeds to step 810 to reorder the cache-expired QoS-satisfied queues in a descending order of their C/I ratios so that a cache-expired QoS-satisfied queue of the highest C/I ratio is positioned at the top of all the cache-expired QoS-satisfied queues. At step 811, a packet is transmitted from the top-position queue at the data rate of the queue as specified in the flow data memory.

If the last packet transmissions of all QoS-satisfied queues have occurred within the predetermined time interval, all the cache memories are not expired and the decision at step 809 is negative. In this case, flow proceeds to step 812 to reorder the cache-unexpired QoS-satisfied queues in a descending order of their C/I ratios so that a cache-unexpired QoS-satisfied queue of the highest C/I ratio is positioned at the top of all the cache-unexpired QoS-satisfied queues. At step 813, a packet is transmitted from the top-position queue at the data rate of the queue as specified in the flow data memory.

Following the execution of either of steps 811 and 813, packet retransmission subroutine 814 is performed on a copy of the packet transmitted from the queue of step 811 or 813. At step 815, the cache memory of the queue of step 811 or 813 is started and flow proceeds to recalculation and updating step 806.

What is claimed is:

1. A method of scheduling packets for transmission from a wireless base station to a plurality of mobile terminals, comprising:
    receiving packets from a network and forming the received packets into a plurality of queues according to destinations of the mobile terminals;
    reordering said queues in a descending order of qualities of wireless links between the base station and said mobile terminals;
    assigning data rates to said queues respectively according to said qualities of wireless links;
    sequentially transmitting packets from the reordered queues to said mobile terminals;
    determining whether a quality of service is not satisfied for any of the wireless links;
    assigning an additional bandwidth to one of said queues in which the quality of service is not satisfied and informing a mobile terminal associated with said queue of the additional assigned bandwidth;
    reordering said queues in which the quality of service is satisfied according to a descending order of qualities of associated wireless links between the base station and said mobile terminals; and
    respectively assigning additional bandwidths to the reordered queues according to the qualities of associated wireless links and informing associated mobile terminals of the additional assigned respective bandwidths.

2. A method of scheduling packets for transmission from a wireless base station to a plurality of mobile terminals, said method comprising:
    receiving packets from a network and forming the received packets into a plurality of queues according to destinations of the mobile terminals;
    reordering said queues in a descending order of qualities of wireless links between the base station and said mobile terminals;
    assigning data rates to said queues respectively according to said qualities of wireless links;
    sequentially transmitting packets from the reordered queues to said mobile terminals;
    storing a copy of a packet transmitted from said queues in a retransmit memory;
    discarding the stored copy of packet from the retransmit memory when an acknowledgement message is received from the destination of the packet; and
    reordering copies of packets stored in said retransmit memory in a descending order of qualities of wireless links between the base station and destination mobile terminals of the stored packet copies and sequentially transmitting the reordered copies to said mobile terminals before transmitting packets from said reordered queues.

3. A method of scheduling packets for transmission from a wireless base station to a plurality of mobile terminals, comprising:
    receiving packets from a network and forming the received packets into a plurality of queues according to destinations of the mobile terminals;
    reordering said queues in a descending order of qualities of wireless links between the base station and said mobile terminals;
    assigning data rates to said queues respectively according to said qualities of wireless links;
    sequentially transmitting packets from the reordered queues to said mobile terminals,
    said method further comprising:
    dividing said queues into a first group of queues in which a last packet transmission has occurred before a predetermined time interval has elapsed and a second group of queues in which the last packet transmission has occurred within said predetermined time interval;
    reordering the queues of the first group of queues in a descending order to said qualities of wireless links and sequentially transmitting all packets from the first group of queues to said mobile terminals; and
    reordering the queues of the second group of queues in a descending order of said qualities of wireless links and sequentially transmitting all packets from the second group of queues to said mobile terminals.

4. A method of scheduling packets for transmission from a wireless base station to a plurality of mobile terminals, said method comprising:
    receiving packets from a network and forming the received packets, according to destinations of said mobile terminals, into a first group of queues in which a quality of service is not satisfied and a second group of queues in which the quality of service is satisfied;
    sequentially transmitting all packets from the queues of the first group to said mobile terminals; and
    reordering the queues of the second group in a descending order of qualities of wireless links between the base station and said mobile terminals, and sequentially transmitting all packets from the reordered queues of the second group to said mobile terminals.

5. The method of claim 4, further comprising:
    storing a copy of a packet transmitted from said second group of queues in a retransmit memory;
    discarding the stored copy of packet from the retransmit memory when an acknowledgement message is received from the destination of the packet; and
    reordering copies of packets stored in said retransmit memory in a descending order of qualities of wireless links between the base station and destination mobile terminals of the stored packet copies and sequentially transmitting the reordered copies to said mobile terminals before transmitting packets from the reordered queues of the second group.

6. The method of claim 4, wherein the reordering the queues of the second group assigns data rates to the queues of said second group respectively according to said qualities of wireless links, and sequentially transmits packets from said queues of the second group at the assigned data rates.

7. The method of claim 4, further comprising:
dividing the queues of said second group into a first subgroup of queues in which a last packet transmission has occurred before a predetermined time interval has elapsed and a second subgroup of queues in which the last packet transmission has occurred within said predetermined time interval;
reordering the queues of the first subgroup of queues in a descending order to said qualities of wireless links and sequentially transmitting all packets from the first subgroup of queues to said mobile terminals; and
reordering the queues of the second subgroup of queues in a descending order to said qualities of wireless links and sequentially transmitting all packets from the second subgroup of queues to said mobile terminals.

8. A packet repeater for repeating packets for transmission from a wireless base station to a plurality of mobile terminals, comprising:
a memory;
a packet analyzer for receiving uplink packets from said mobile terminals and storing data indicating a quality of each wireless link between the base station and each of said mobile terminals in said memory;
a plurality of buffers;
a packet sorter for receiving downlink packets from a network and storing the received packets into said buffers according to destinations of the downlink packets; and
a packet scheduler for transmitting a packet from one of said queues which is formed prior to a predetermined past time interval, reordering those of said queues which are formed within said predetermined past time interval in a descending order of qualities of wireless links between the base station and said mobile terminals, and sequentially transmitting packets from the reordered queues to said mobile terminals.

9. The packet repeater of claim 8, further comprising a bandwidth assignment unit which performs functions of:
assigning an additional bandwidth to one of said queues in which quality of service is not satisfied and informing a mobile terminal of the assigned bandwidth;
reordering said queues in which quality of service is satisfied according to a descending order of qualities of associated wireless links between the base station and said mobile terminals; and
respectively assigning additional bandwidths to the reordered queues according to the qualities of associated wireless links and informing the mobile terminals of the assigned respective bandwidths.

10. The packet repeater of claim 8, further comprising a retransmit memory, and wherein the packet scheduler further performs functions of:
storing a copy of a packet transmitted from said second group of queues in said retransmit memory;
discarding the stored copy of packet from the retransmit memory when an acknowledgement message is received from the destination of the packet; and
reordering copies of packets stored in said retransmit memory in a descending order of qualities of wireless links between the base station and destination mobile terminals of the stored packet copies and sequentially transmitting the reordered copies to said mobile terminals before transmitting packets from said reordered queues.

11. The packet repeater of claim 8, wherein said packet scheduler further performs functions of:
dividing said queues into a first group of queues in which a last packet transmission has occurred before a predetermined time interval has elapsed and a second subgroup of queues in which the last packet transmission has occurred within said predetermined time interval;
reordering the queues of the first group of queues in a descending order to said qualities of wireless links and sequentially transmitting all packets from the first group of queues to said mobile terminals; and
reordering the queues of the second group of queues in a descending order to said qualities of wireless links and sequentially transmitting all packets from the second group of queues to said mobile terminals.

12. A packet repeater for repeating packets for transmission from a wireless base station to a plurality of mobile terminals, comprising:
a memory;
a packet analyzer for receiving uplink packets from said mobile terminals and storing data indicating a quality of each wireless link between the base station and each of said mobile terminals in said memory;
a plurality of buffers;
a packet sorter for receiving downlink packets from a network and storing the received packets into said buffers according to destinations of the downlink packets; and
a packet scheduler for reordering said queues in a descending order of qualities of wireless links between the base station and said mobile terminals, assigning data rates to said queues respectively according to said qualities of wireless links, and sequentially transmitting packets from the reordered queues to said mobile terminals; and
a bandwidth assignment unit which performs functions of:
assigning an additional bandwidth to one of said queues in which the quality of service is not satisfied and informing a mobile terminal of the assigned bandwidth;
reordering said queues in which the quality of service is satisfied according to a descending order of qualities of associated wireless links between the base station and said mobile terminals; and
respectively assigning additional bandwidths to the reordered queues according to the qualities of associated wireless links and informing the mobile terminals of the assigned respective bandwidths.

13. A packet repeater for repeating packets for transmission from a wireless base station to a plurality of mobile terminals, comprising:
a memory;
a packet analyzer for receiving uplink packets from said mobile terminals and storing data indicating a quality of each wireless link between the base station and each of said mobile terminals in said memory;
a plurality of buffers;
a packet sorter for receiving downlink packets from a network and storing the received packets into said buffers according to destinations of the downlink packets;
a packet scheduler for reordering said queues in a descending order of qualities of wireless links between the base station and said mobile terminals, assigning data rates to said queues respectively according to said qualities of wireless links, and sequentially transmitting packets from the reordered queues to said mobile terminals; and
a retransmit memory,
wherein the packet scheduler further performs functions of:

storing a copy of a packet transmitted from said second group of queues in said retransmit memory;
discarding the stored copy of packet from the retransmit memory when an acknowledgement message is received from the destination of the packet; and
reordering copies of packets stored in said retransmit memory in a descending order of qualities of wireless links between the base station and destination mobile terminals of the stored packet copies and sequentially transmitting the reordered copies to said mobile terminals before transmitting packets from said reordered queues.

14. A packet repeater for repeating packets for transmission from a wireless base station to a plurality of mobile terminals, comprising:
a memory;
a packet analyzer for receiving uplink packets from said mobile terminals and storing data indicating a quality of each wireless link between the base station and each of said mobile terminals in said memory;
a plurality of buffers;
a packet sorter for receiving downlink packets from a network and storing the received packets into said buffers according to destinations of the downlink packets; and
a packet scheduler for reordering said queues in a descending order of qualities of wireless links between the base station and said mobile terminals, assigning data rates to said queues respectively according to said qualities of wireless links, and sequentially transmitting packets from the reordered queues to said mobile terminals,
wherein said packet scheduler further performs functions of:
dividing said queues into a first group of queues in which a last packet transmission has occurred before a predetermined time interval has elapsed and a second subgroup of queues in which the last packet transmission has occurred within said predetermined time interval;
reordering the queues of the first group of queues in a descending order to said qualities of wireless links and sequentially transmitting all packets from the first group of queues to said mobile terminals; and
reordering the queues of the second group of queues in a descending order of said qualities of wireless links and sequentially transmitting all packets from the second group of queues to said mobile terminals.

15. A packet repeater for repeating packets for transmission from a wireless base station to a plurality of mobile terminals, comprising:
a memory;
a packet analyzer for receiving uplink packets from said mobile terminals and storing data indicating a quality of each wireless link between the base station and each of said mobile terminals in said memory;
a plurality of buffers;
a packet sorter for receiving downlink packets from a network and storing the received packets into said buffers according to destinations of the downlink packets and data stored in said memory to form a first group of queues in which a quality of service is not satisfied and a second group of queues in which the quality of service is satisfied; and
a packet scheduler for sequentially transmitting all packets from the queues of the first group to said mobile terminals, and reordering the queues of the second group in a descending order of qualities of wireless links between the base station and said mobile terminals, and sequentially transmitting all packets from the reordered queues of the second group to said mobile terminals.

16. The packet repeater of claim 15, further comprising a retransmit memory, and wherein the packet scheduler further performs functions of:
storing a copy of a packet transmitted from said second group of queues in said retransmit memory;
discarding the stored copy of the packet from the retransmit memory when an acknowledgement message is received from the destination of the packet; and
reordering copies of packets stored in said retransmit memory in a descending order of qualities of wireless links between the base station and destination mobile terminals of the stored packet copies and sequentially transmitting the reordered copies to said mobile terminals before transmitting packets from the reordered queues of the second group.

17. The packet repeater of claim 15, wherein the packet scheduler assigns data rates to the queues of said second group respectively according to said qualities of wireless links, and sequentially transmits packets from said queues of the second group at the assigned data rates.

18. The packet repeater of claim 15, wherein said packet scheduler further performs functions of:
dividing the queues of said second group into a first subgroup of queues in which a last packet transmission has occurred before a predetermined time interval has elapsed and a second subgroup of queues in which the last packet transmission has occurred within said predetermined time interval;
reordering the queues of the first subgroup of queues in a descending order to said qualities of wireless links and sequentially transmitting all packets from the first subgroup of queues to said mobile terminals; and
reordering the queues of the second subgroup of queues in a descending order to said qualities of wireless links and sequentially transmitting all packets from the second subgroup of queues to said mobile terminals.

19. A non-transitory computer-readable storage medium containing a program of machine-readable instructions for executing a method of scheduling packets for transmission from a wireless base station to a plurality of mobile terminals, said program method comprising:
receiving packets from a network and forming the received packets into a plurality of queues according to destinations of said mobile terminals; and
reordering said queues in a descending order of qualities of wireless links between the base station and said mobile terminals;
assigning data rates to said queues respectively according to said qualities of wireless links; and
sequentially transmitting packets from the reordered queues to said mobile terminals;
assigning an additional bandwidth to one of said queues in which quality of service is not satisfied and informing a mobile terminal of the assigned bandwidth;
reordering said queues in which quality of service is satisfied according to a descending order of qualifies of associated wireless links between the base station and said mobile terminals; and
respectively assigning additional bandwidths to the reordered queues according to the qualities of associated wireless links and informing the mobile terminals of the assigned respective bandwidths.

20. A non-transitory computer-readable storage medium containing a program of machine-readable instructions for executing a method of scheduling packets for transmission from a wireless base station to a plurality of mobile terminals, said program method comprising:
- receiving packets from a network and forming the received packets into a plurality of queues according to destinations of said mobile terminals; and
- reordering said queues in a descending order of qualities of wireless links between the base station and said mobile terminals;
- assigning data rates to said queues respectively according to said qualities of wireless links; and
- sequentially transmitting packets from the reordered queues to said mobile terminals;
- storing a copy of a packet transmitted from said queues in a retransmit memory;
- discarding the stored copy of packet from the retransmit memory when an acknowledgement message is received from the destination of the packet; and
- reordering copies of packets stored in said retransmit memory in a descending order of qualities of wireless links between the base station and destination mobile terminals of the stored packet copies and sequentially transmitting the reordered copies to said mobile terminals before transmitting packets from said reordered queues.

21. A non-transitory computer-readable storage medium containing a program of machine-readable instructions for executing a method of scheduling packets for transmission from a wireless base station to a plurality of mobile terminals, said program method comprising:
- receiving packets from a network and forming the received packets into a plurality of queues according to destinations of said mobile terminals; and
- reordering said queues in a descending order of qualities of wireless links between the base station and said mobile terminals;
- assigning data rates to said queues respectively according to said qualities of wireless links; and
- sequentially transmitting packets from the reordered queues to said mobile terminals;
- dividing said queues into a first group of queues in which last packet transmission has occurred before a predetermined time interval has elapsed and a second group of queues in which last packet transmission has occurred within said predetermined time interval;
- reordering the queues of the first group of queues in a descending order to said qualities of wireless links and sequentially transmitting all packets from the first group of queues to said mobile terminals; and
- reordering the queues of the second group of queues in a descending order of said qualities of wireless links and sequentially transmitting all packets from the second group of queues to said mobile terminals.

22. A non-transitory computer-readable storage medium containing a program of machine-readable instructions for executing a method for scheduling packets for transmission from a wireless base station to a plurality of mobile terminals, said method comprising:
- receiving packets from a network and forming the received packets, according to destinations of said mobile terminals, into a first group of queues in which a quality of service is not satisfied and a second group of queues in which the quality of service is satisfied;
- sequentially transmitting all packets from the queues of the first group to said mobile terminals; and
- reordering the queues of the second group in a descending order of qualities of wireless links between the base station and said mobile terminals, and sequentially transmitting all packets from the reordered queues of the second group to said mobile terminals.

23. The non-transitory computer-readable storage medium of claim 22, said method further comprising:
- storing a copy of a packet transmitted from said second group of queues in a retransmit memory;
- discarding the stored copy of packet from the retransmit memory when an acknowledgement message is received from the destination of the packet; and
- reordering copies of packets stored in said retransmit memory in a descending order of qualities of wireless links between the base station and destination mobile terminals of the stored packet copies and sequentially transmitting the reordered copies to said mobile terminals before transmitting packets from the reordered queues of the second group.

24. The non-transitory computer-readable storage medium of claim 22, wherein said reordering of the queues assigns data rates to the queues of said second group respectively according to said qualities of wireless links, and sequentially transmits packets from said queues of the second group at the assigned data rates.

25. The non-transitory computer-readable storage medium of claim 22, said method further comprising:
- dividing the queues of said second group into a first subgroup of queues in which a last packet transmission has occurred before a predetermined time interval has elapsed and a second subgroup of queues in which the last packet transmission has occurred within said predetermined time interval;
- reordering the queues of the first subgroup of queues in a descending order to said qualities of wireless links and sequentially transmitting all packets from the first subgroup of queues to said mobile terminals; and
- reordering the queues of the second subgroup of queues in a descending order to said qualities of wireless links and sequentially transmitting all packets from the second subgroup of queues to said mobile terminals.

26. A method of scheduling packets for transmission from a wireless base station to a plurality of mobile terminals, said method comprising:
- receiving packets from a network and forming the received packets into a plurality of queues according to destinations of said mobile terminals;
- transmitting a packet from one of said queues which is formed prior to a predetermined past time interval;
- reordering those of said queues which are formed within said predetermined past time interval in a descending order of qualities of wireless links between the base station and said mobile terminals;
- sequentially transmitting packets from the reordered queues to said mobile terminals;
- assigning an additional bandwidth to one of said queues in which a quality of service is not satisfied and informing a mobile terminal of the assigned bandwidth;
- reordering said queues in which the quality of service is satisfied according to a descending order of qualities of associated wireless links between the base station and said mobile terminals; and
- respectively assigning additional bandwidths to the reordered queues according to the qualities of associated wireless links and informing the mobile terminals of the assigned respective bandwidths.

27. A method of scheduling packets for transmission from a wireless base station to a plurality of mobile terminals, said method comprising:

receiving packets from a network and forming the received packets into a plurality of queues according to destinations of said mobile terminals;

transmitting a packet from one of said queues which is formed prior to a predetermined past time interval;

reordering those of said queues which are formed within said predetermined past time interval in a descending order of qualities of wireless links between the base station and said mobile terminals;

sequentially transmitting packets from the reordered queues to said mobile terminals;

storing a copy of a packet transmitted from said queues in a retransmit memory;

discarding the stored copy of packet from the retransmit memory when an acknowledgement message is received from the destination of the packet; and reordering copies of packets stored in said retransmit memory in a descending order of qualities of wireless links between the base station and destination mobile terminals of the stored packet copies and sequentially transmitting the reordered copies to said mobile terminals before transmitting packets from said reordered queues.

28. A method of scheduling packets for transmission from a wireless base station to a plurality of mobile terminals, said method comprising:

receiving packets from a network and forming the received packets into a plurality of queues according to destinations of said mobile terminals;

transmitting a packet from one of said queues which is formed prior to a predetermined past time interval;

reordering those of said queues which are formed within said predetermined past time interval in a descending order of qualities of wireless links between the base station and said mobile terminals;

sequentially transmitting packets from the reordered queues to said mobile terminals;

dividing said queues into a first group of queues in which a last packet transmission has occurred before a predetermined time interval has elapsed and a second group of queues in which the last packet transmission has occurred within said predetermined time interval;

reordering the queues of the first group of queues in a descending order to said qualities of wireless links and sequentially transmitting all packets from the first group of queues to said mobile terminals; and reordering the queues of the second group of queues in a descending order to said qualities of wireless links and sequentially transmitting all packets from the second group of queues to said mobile terminals.

29. A computer-readable storage medium containing a program of machine-readable instructions for executing a method of scheduling packets for transmission from a wireless base station to a plurality of mobile terminals, said method comprising:

receiving packets from a network and forming the received packets into a plurality of queues according to destinations of said mobile terminals;

transmitting a packet from one of said queues which is formed prior to a predetermined past time interval;

reordering those of said queues which are formed within said predetermined past time interval in a descending order of qualities of wireless links between the base station and said mobile terminals;

sequentially transmitting packets from the reordered queues to said mobile terminals;

storing a copy of a packet transmitted from said queues in a retransmit memory;

discarding the stored copy of packet from the retransmit memory when an acknowledgement message is received from the destination of the packet; and reordering copies of packets stored in said retransmit memory in a descending order of qualities of wireless links between the base station and destination mobile terminals of the stored packet copies and sequentially transmitting the reordered copies to said mobile terminals before transmitting packets from said reordered queues.

30. A computer-readable storage medium containing a program of machine-readable instructions for executing a method of scheduling packets for transmission from a wireless base station to a plurality of mobile terminals, said program method comprising:

receiving packets from a network and forming the received packets into a plurality of queues according to destinations of said mobile terminals;

transmitting a packet from one of said queues which is formed prior to a predetermined past time interval;

reordering those of said queues which are formed within said predetermined past time interval in a descending order of qualities of wireless links between the base station and said mobile terminals;

sequentially transmitting packets from the reordered queues to said mobile terminals;

dividing said queues into a first group of queues in which a last packet transmission has occurred before a predetermined time interval has elapsed and a second group of queues in which the last packet transmission has occurred within said predetermined time interval;

reordering the queues of the first group of queues in a descending order to said qualities of wireless links and sequentially transmitting all packets from the first group of queues to said mobile terminals; and reordering the queues of the second group of queues in a descending order to said qualities of wireless links and sequentially transmitting all packets from the second group of queues to said mobile terminals.

* * * * *